(12) United States Patent
Miller

(10) Patent No.: US 6,952,784 B1
(45) Date of Patent: Oct. 4, 2005

(54) MULTI-SOURCE POWER SWITCHING CIRCUIT FOR WAKE ON LAN ETHERNET APPLICATION

(75) Inventor: David J. Miller, Lawrenceville, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 619 days.

(21) Appl. No.: 10/075,147

(22) Filed: Feb. 14, 2002

(51) Int. Cl.[7] .............................. G06F 1/32; G06F 1/26

(52) U.S. Cl. ...................................................... 713/300

(58) Field of Search ................................ 713/300, 320, 713/324

(56) References Cited

U.S. PATENT DOCUMENTS

| | | | | |
|---|---|---|---|---|
| 5,938,771 A | * | 8/1999 | Williams et al. | ............ 713/310 |
| 6,256,732 B1 | * | 7/2001 | Cromer et al. | .................. 713/2 |
| 6,560,714 B1 | * | 5/2003 | Ho et al. | ..................... 713/340 |
| 6,564,333 B1 | * | 5/2003 | Ho et al. | ..................... 713/340 |
| 6,760,850 B1 | * | 7/2004 | Atkinson et al. | ............ 713/320 |

FOREIGN PATENT DOCUMENTS

EP 458104 A2 * 11/1991 ............. G06F 1/26

OTHER PUBLICATIONS

"Magic Packet Adapter Card Implementation," Advanced Micro Devices, Inc., 1998, pp. 1-7.

* cited by examiner

Primary Examiner—Thomas Lee
Assistant Examiner—Mark Connolly

(57) ABSTRACT

A power and power management signaling circuit in a network interface card (NIC) for all known Wake On LAN PCI bus configurations includes a single voltage regulator together with connections to a network-initiated power management recovery signal MPT_PMEN from the network interface, power management recovery and auxiliary power signals PME_N and AUX3V within the PCI bus, and a system motherboard header. A first inverter inverts MPT_PMEN to the PME signal for the header, while a second inverter gates auxiliary power AUXVDD to main power PCIVDD for the NIC when the PCI system power PCI5V is asserted. Diodes prevent back powering of the PCI bus during hibernate states, system power short circuiting and leakage malfunctions when the header is incorrectly connected or unconnected, and auxiliary power shorts to ground when the previously undefined AUX3V PCI bus line is grounded.

20 Claims, 2 Drawing Sheets

MULTI-SOURCE POWER SWITCHING CIRCUIT FOR WAKE ON LAN ETHERNET APPLICATION

TECHNICAL FIELD OF THE INVENTION

The present invention is directed, in general, to data processing system power management over networks and, more specifically, to providing power within network interface cards which may be installed in a variety of different environments including systems supporting network power management.

BACKGROUND OF THE INVENTION

Power management schemes for data processing systems such as desktop computers allow the system to suspend power to one or more selected components during extended periods of inactivity. Systems "wake up" from power saving states when the user touches the keyboard or mouse, or some other user input device is actuated. In addition, "Wake On Lan" capability has been developed for many systems, allowing a system administrator to wake any system connected to a network and check the status of that system via the network.

The Peripheral Component Interconnect (PCI) bus standard is one architecture within which network power management support has evolved, allowing a system administrator to wake up systems on the network by sending a special, "magic" packet which a network interface card (NIC) installed in a PCI bus slot recognizes as a signal to wake up the machine from powered down states. However, some systems do not support Wake On LAN functionality (or "network-initiated power management recovery"), while others support such functionality but utilize different mechanisms. One result is that a network interface card intended for use in all such environments must support a variety of power and signaling requirements. Current solutions typically employ independent voltage regulators for each of the different mechanisms and/or power requirements, an expensive design.

There is, therefore, a need in the art for a power system for a network interface card that supports multiple power and power management signaling configurations without multiple power regulators.

SUMMARY OF THE INVENTION

To address the above-discussed deficiencies of the prior art, it is a primary object of the present invention to provide, for use in a network interface card (NIC) controller, a power and power management signaling circuit for all known Wake On LAN PCI bus configurations that includes only a single voltage regulator. The circuit provides for connections to a network-initiated power management recovery signal MPT_PMEN from the network interface, power management recovery and auxiliary power signals PME_N and AUX3V within the PCI bus, and a system motherboard header. A first inverter inverts MPT_PMEN to the PME signal for the header, while a second inverter gates auxiliary power AUXVDD to main power PCIVDD for the NIC when the PCI system power PCI5V is asserted. Diodes prevent back powering of the PCI bus during hibernate states, system power short circuiting and leakage malfunctions when the header is incorrectly connected or unconnected, and auxiliary power shorts to ground when the previously undefined AUX3V PCI bus line is grounded.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
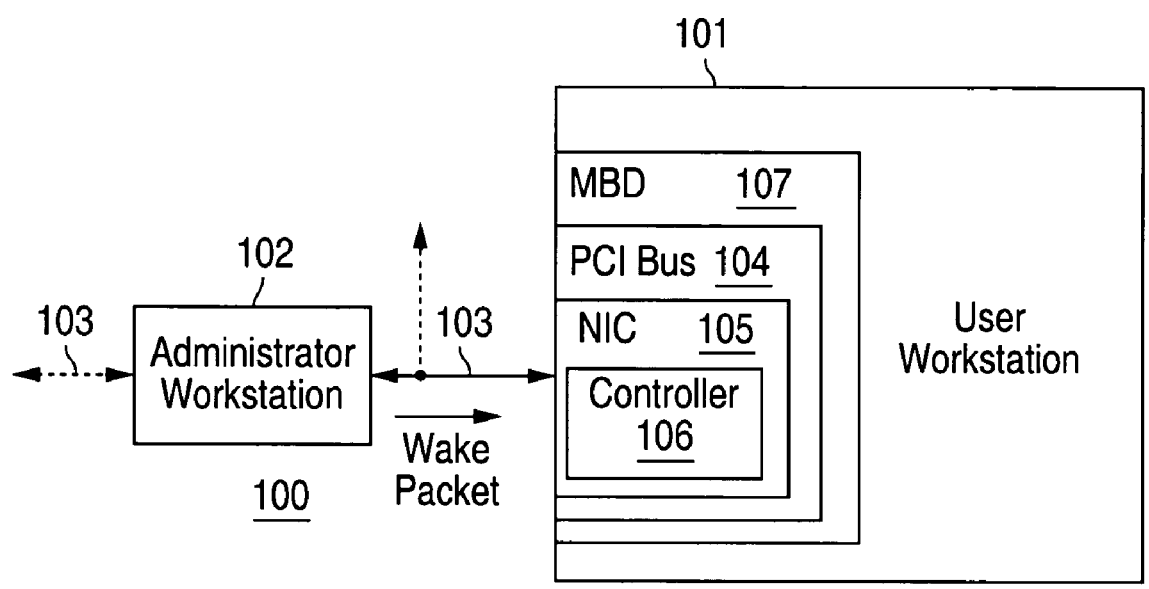
FIG. 1 depicts a data processing system network including a network interface card supporting multiple power requirements and power management signaling configurations with a single voltage regulator according to one embodiment of the present invention.
Figure 2:
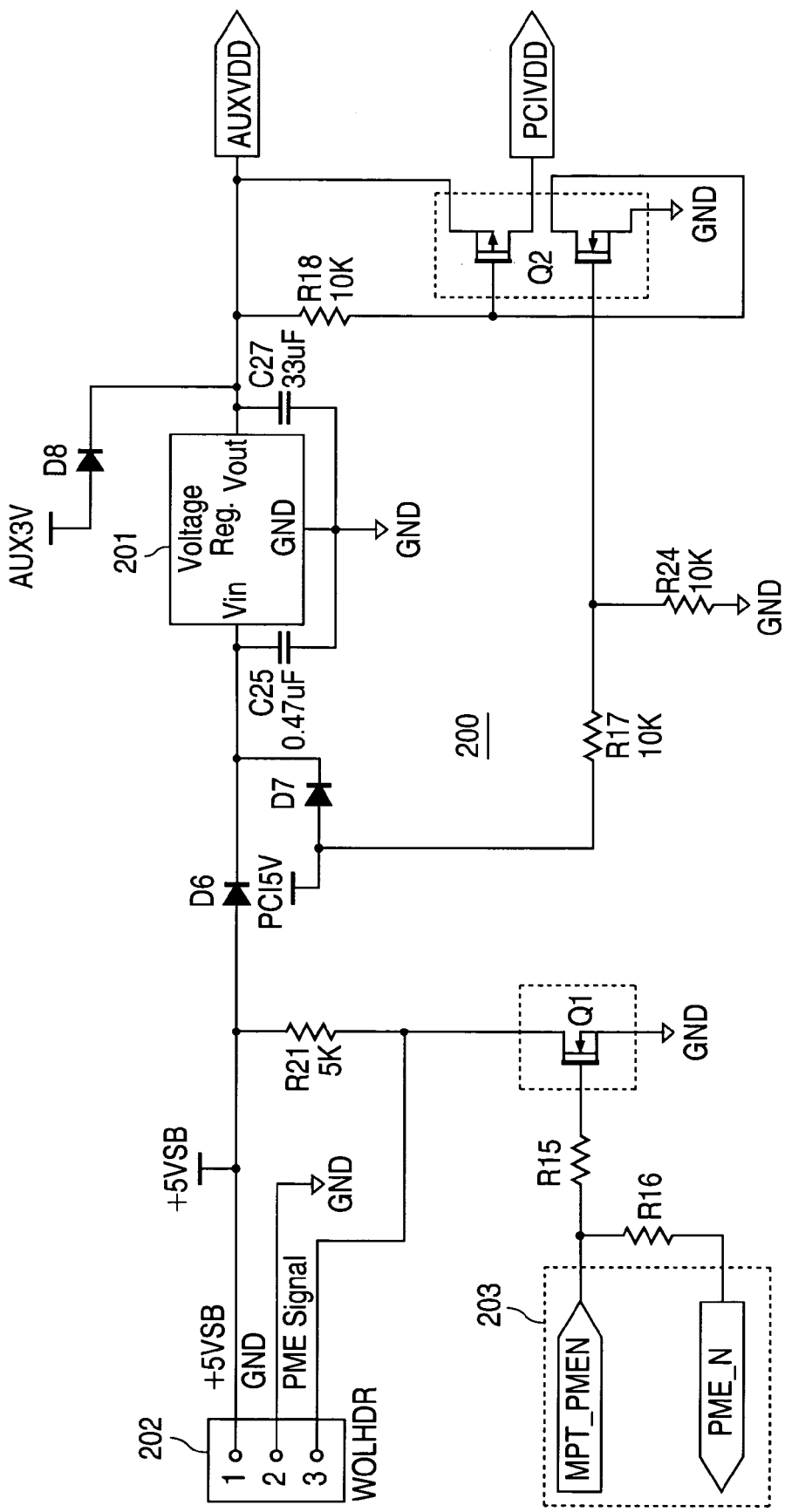
FIG. 2 is a circuit diagram illustrating in greater detail a power source and power management signaling control mechanism employed by a network interface card supporting multiple power requirements and power management signaling configurations with a single voltage regulator according to one embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a data processing system network including a network interface card supporting multiple power requirements and power management signaling configurations with a single voltage regulator according to one embodiment of the present invention. Data processing system network 100 includes a plurality of data processing systems 101–102 communicably coupled to each other, as well as to other data processing systems (not shown), by a network connection 103. The infrastructure represented by network connection 103 may comprise, for example, an Ethernet local area network (LAN).

The complete construction and operation of data processing system network 100, as well as of the data processing systems 101–102 and other components therein, is not depicted in FIG. 1 or described herein. Instead, for simplicity and clarity, only so much of the data processing system network and its components as is unique to the present invention or necessary for an understanding of the present invention is depicted and described.

In the example shown, data processing system 101 is a user workstation and data processing system 102 is a network administrator workstation. Workstation 101 may or may not support power management, or alternatively may support power management with or without Wake On LAN capabilities and, if supporting Wake On LAN, may utilize one of several different power and power management signaling configurations described in further detail below. Workstation 102 may selectively transmit a wake or "magic" packet over network connection 103 to workstation 101 to cause the workstation 101 to resume full power operations from a suspended or partially suspended power state if workstation 101 supports Wake On LAN cabability.

Workstation 101 includes, in the example shown, a Peripheral Component Interconnect (PCI) bus 104 and a network interface card (NIC) 105 installed in one of the bus slots of the PCI bus 104 and enabling communications between workstation 101 and network connection 103—that is, for example, network interface card 105 allows a processor and memory (not shown) located on a motherboard containing PCI bus 104 to send and receive packets via network connection 103.

Network interface card 105 includes a controller 106, preferably implemented by a single integrated circuit adapted for direct connection (via signal lines to an edge connector or the like) with no external circuitry to PCI bus 104, controlling operation of the network interface card 105 including responsiveness, if any, to received wake or "magic" packets and associated power management signaling.

The PCI bus standard as originated in the early 1990's only required power supply voltages of +5V, +12V and –12V and specified little or no power saving or power management features. A more current version (revision 2.2, presently available at www.pcisig.com/specifications) of the PCI bus standard specification allows for several levels of power saving states, each powering down the system to increasingly low levels of power consumption, which accordingly requiring increasingly longer recovery periods. In the most advanced power saving state, system status is saved to nonvolatile memory and the system is almost completely powered off.

The Wake On LAN mechanism specified by the PCI 2.2 specification requires the network interface card to remain active through an auxiliary 3.3V power source even if the main system power (and PCI bus power) is shut down. A specific, defined power management enable PMEN signal from the network interface card to the main system power controller is asserted low on the PCI bus in response to receipt of a wake or "magic" packet in order to initiate recovery from any suspended state.

Prior to release and general acceptance of the PCI 2.2 specification, however, many data processing system and (network interface card) vendors offered a Wake On LAN implementation recommended by and published in an Application Note entitled "Magic Packet Adapter Card Implementation," Publication No. 21385, rev. A, amendment 0 (September 1997) from Advanced Micro Devices, Inc. (AMD) of Sunnyvale, Calif. This Application Note defined a 3 pin header connection to the motherboard (MBD) 107 through which a network interface card could connect to an auxiliary 5V power source as well as to assert a 5V high power management enable (PME) signal (as opposed to the low or 0V assertion level of the PMEN signal according to the PCI 2.2 specification) to initiate recovery from power suspension.

To further complicate matters, some systems currently in operation support partial or mixed compliance to the PCI 2.2 specification—i.e., support for bus-asserted PMEN as well as header-provided support of 5V auxiliary power and 5V PME wake up capabilities. Moreover, the PCI 3.3V auxiliary power source signal known as 3VAUX was undefined prior to the PCI 2.2 specification, with the result that the associated signal connection was commonly grounded within many systems developed before publication of the PCI 2.2 specification.

Network interface card 105, including particularly controller 106, should therefore preferably function in all of the different environments described above, working in all PCI systems which have been manufactured to date and are currently in operation while taking maximum advantage of all features in such systems. In order to accomplish such a result, the network interface card 105 and controller 106 should work in: old 5V-only PCI systems that do not support Wake On LAN; 5V systems which support Wake On LAN via the AMD-defined 3 pin header interface; and PCI buses which are both partially and completely compliant with the PCI 2.2 specification (i.e., either compliant only with the PCI 2.2 specification or compliant with both the PCI 2.2 specification and the AMD-defined 3 pin header interface).

FIG. 2 is a circuit diagram illustrating in greater detail a power source and power management signaling control mechanism employed by a network interface card supporting multiple power requirements and power management signaling configurations with a single voltage regulator according to one embodiment of the present invention. Power source and power management signaling control circuit 200 is implemented, preferably as an integrated circuit, within controller 106 depicted in FIG. 1.

Circuit 200 includes a single voltage regulator 201, a 3 pin Wake On LAN header (WOLHDR) connection 202 to the system motherboard 107, and a PCI network interface connection 203 for connection to selected signal connections within the network interface between the network interface card 105 and the PCI bus 104. Within connection 202, the uninterrupted 5V auxiliary power supplied through the 3 pin header in systems employing the pre-PCI 2.2 specification Wake On LAN capability is connected to signal line +5VSB, while the high level (5V0 asserted wake up signal which goes to the header in such systems is connected to signal line PME_Signal. Within connection 203, the (asserted low) PMEN signal from the network interface indicating receipt of a network-initiated power management recovery signal (wake or "magic" packet) and triggering wake up of the system is connected to signal line MPT_PMEN, while the (low asserted) PMEN wake up signal which is transmitted via the PCI bus 104 is connected to signal line PME__N.

Circuit 200 is adapted to receive power from any of a number of power sources, including 5V system power from the PCU bus 104 (which is removed from the PCI bus 104 in the power saving state commonly referred to as "hibernate") via signal line PCI5V and PCI 2.2 specification compliant 3V auxiliary power supplied from a PCI 2.2 specification compliant PCI bus via signal line AUX3V. Circuit 200 also outputs power to the remainder of the network interface card 105 via signal line PCIVDD (from which power is removed when the system enters a hibernate state) and, in an uninterrupted manner to keep the remainder of the network interface card alive when the system power on signal line PCIVDD is removed, via signal line AUXVDD.

When network interface card 105 is installed within a system, the signal line MPT__PMEN is connected to the corresponding signal line connection within the network interface, signal lines PME__N and AUX3V are connected to the counterpart signal lines within the PCI bus 104, and, optionally, connections 202 are connected to the 3 pin header provided on the motherboard.

In operation, complementary metal oxide semiconductor (CMOS) field effect transistor (FET) based inverter Q1 inverts the network-initiated power management recovery signal on signal line MPT__PMEN from connection 203 to generate the PME signal on signal line PME__Signal to connection 203. The 20 kilo-Ohm (KΩ) pullup resistor R21 between the header auxiliary power on signal line +5VSB and the field effect transistor gates within inverter Q1 provides sufficient current to bias the field effect transistors in inverter Q1 when circuit 200 is plugged into a header without excessively loading (and causing the malfunction of) the network-initiated power management recovery signal on signal line MPT__PMEN from the network interface.

The PME functionality described above is summarized in Table I below:

TABLE I

| Inputs | | Outputs | |
|---|---|---|---|
| +5VSB | MPT__PMEN | PME__N | PME__Signal |
| 5 V | 0 V | 0 V | 5 V |
| 5 V | 3.3 V | 3.3 V | 0 V |
| 0 V | 0 V | 0 V | — |
| 0 V | 3.3 V | 3.3 V | — |

The PCI 2.2 standard specifies that both 3.3V and 5V system power sources be available on the PCI bus 104. In many older systems, 3.3V power was not made available. Therefore, to enable operation in both 3.3V and older 5V systems, regulator 201 regulates the 5V power source on signal lines PCI5V and +5VSB down to the 3.3V power required by the network interface card 105.

Depending upon the system, auxiliary power can come from any of three sources. In a normal, non-power-reduced state for systems that do not implement Wake On LAN capabilities, auxiliary power must come from the PCI bus on signal line PCI5V. Therefore a diode D7 is connected in series between the input for signal line PCI5V and voltage regulator 201 to prevent the network interface card 105, when installed in other systems, from back powering the bus while such other systems are in a hibernate state.

In pre-PCI 2.2 specification Wake On LAN capable systems employing the 3 pin header, auxiliary power comes from the connection to signal line +5VSB on the header. A diode D6 is placed in series between the header connection to signal line +5VSB and the voltage regulator 201 input to prevent system power short circuit should the header be incorrectly connected, and to prevent system power leakage causing a malfunction of the PME inverter circuit Q1 if the circuit 200 is not connected to a header.

Finally, in PCI 2.2 specification compliant systems, auxiliary power on signal line AUX3V comes directly from the PCI bus 104. A diode D8 is required in series between the input for signal line AUX3V and the voltage regulator 201 since many older systems shipped prior to definition of the AUX3V PCI bus signal simply grounded the PCI bus AUX3V signal line. Direct connection in such cases would short circuit auxiliary power to ground in those systems, causing catastrophic system failure.

When the system powers down, the power on signal line PCIVDD switches while signal line AUXVDD remains powered, as described earlier. A simple implementation for such switching would involve two regulators, one from both the system and auxiliary sources on signal lines PCI5V and +5VSB/AUX3V and the other from just the switched system power source on signal line PCI5V. However, regulators are relatively expensive parts as compared to simple switching transistors. Therefore CMOS inverter Q2 serves to switch the auxiliary power on signal line AUXVDD on and off depending on the state of the system bus power on signal line PCI5V. The lower (n-channel or NMOS) FET inverts the signal on PCI5V, switching (p-channel or PMOS) FET on and off. When PCI5V is asserted, the upper FET gates the signal on signal line AUXVDD to signal line PCIVDD, providing power to the network interface card when the system is powered up.

The power functionality described above is summarized in Table II below:

TABLE II

| Inputs | | | Outputs | |
|---|---|---|---|---|
| +5VSB | PCI5V | AUX3V | AUXVDD | PCIVDD |
| 0 V | 0 V | 0 V | 0 V | 0 V |
| 0 V | 0 V | 3.3 V | 3 V | 0 V |
| 0 V | 5 V | 0 V | 3.3 V | 3.3 V |
| 0 V | 5 V | 3.3 V | 3.3 V | 3.3 V |
| 5 V | 0 V | 0 V | 3.3 V | 0 V |
| 5 V | 0 V | 3.3 V | 3.3 V | 0 V |
| 5 V | 5 V | 0 V | 3.3 V | 3.3 V |
| 5 V | 5 V | 3.3 V | 3.3 V | 3.3 V |

With simple circuitry and functionality, the present invention provides a flexible, low cost solution to the difficult problem of satisfying power and power management signaling requirements for multiple—and very often conflicting—Wake On LAN system configurations. Poorly implemented Wake On LAN circuits have the potential to short system power to ground, to lock systems up, to never allow systems to enter reduced power states, or even to not allow systems to power down. The solution of the present invention avoids these pitfalls while providing Wake On LAN functionality (as needed) and operation in all known existing PCI bus environments with a minimum number of components and therefore a minimum cost.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. For use in a network interface controller, a power source and power management signaling control system comprising:
   a voltage regulator;
   a first connection coupled to the voltage regulator for connection to a network-initiated power management recovery signal and a power management recovery bus signal;
   a second connection coupled to the voltage regulator for selective connection to a motherboard header; and
   an inverter capable of gating auxiliary power for a network interface card to main power for the network interface card when a bus power signal is asserted and disconnecting the auxiliary power from the main power when the bus power signal is not asserted;
   wherein the control system is operable to provide power to the network interface card and power management signals, if necessary, within each of: a system not supporting network-initiated power management recovery, a system supporting network-initiated power management recovery through the header, and a system supporting network-initiated power management recovery through the power management recovery bus signal.

2. The control system according to claim 1, further comprising:
   a third connection coupled to the voltage regulator for connection to an auxiliary power bus signal;
   wherein the control system is operable to provide the auxiliary power to the network interface card within a system not providing auxiliary power, within a system providing auxiliary power from the header, and within a system providing auxiliary power from the auxiliary power bus signal.

3. The control system according to claim 2, wherein grounding of the auxiliary power bus signal does not affect provision of auxiliary power to the network interface card by the control system.

4. The control system according to claim 1, further comprising:
   a second inverter inverting the network-initiated power management recovery signal to the header.

5. The control system according to claim 4, wherein the second inverter is capable of inverting the network-initiated power management recovery signal to generate a Power Management Event (PME) signal for the motherboard header.

6. The control system according to claim 1, further comprising:
   diodes preventing back powering of a bus to which the control system is coupled during hibernate states, system power short circuiting of and leakage malfunctions in the control system when the header is incorrectly connected or unconnected to the motherboard, and auxiliary power shorts to ground when an auxiliary power bus signal coupled to the control system is grounded.

7. The control system according to claim 1, wherein the control system is operable within a system that does not provide 3.3V power to provide 3.3V power from the voltage regulator.

8. The control system according to claim 1, wherein the inverter comprises:
   a first transistor coupled to the main power and the auxiliary power; and
   a second transistor coupled to the first transistor, the auxiliary power, and the bus power signal.

9. A network interface controller comprising:
   connections for selectively coupling the controller to a network interface card adapted for installation within a Peripheral Component Interconnect (PCI) bus slot; and
   a power control circuit coupled to the connections, the control circuit comprising:
      a first connection coupling a voltage regulator to a network-initiated power management recovery signal and a power management recovery bus signal; and
      a second connection selectively coupling the voltage regulator to a motherboard header; and
      diodes capable of preventing back powering of a bus to which the control circuit is coupled during hibernate states, system power short circuiting of and leakage malfunctions in the control circuit when the header is incorrectly connected or unconnected to the motherboard, and auxiliary power shorts to ground when an auxiliary power bus signal coupled to the control circuit is grounded;
      wherein the controller is operable to provide power to the network interface card within any of: a system not supporting network-initiated power management recovery, a system supporting network-initiated power management recovery through the header, and a system supporting network-initiated power management recovery through the power management recovery bus signal.

10. The controller according to claim 9, further comprising:
    a third connection coupling the voltage regulator to the auxiliary power bus signal;
    wherein the control circuit is operable to provide auxiliary power to the network interface card within a system not providing auxiliary power, within a system providing auxiliary power from the header, and within a system providing auxiliary power from the auxiliary power bus signal.

11. The controller according to claim 10, wherein grounding of the auxiliary power bus signal does not affect provision of auxiliary power to the network interface card by the control circuit.

12. The controller according to claim 9, further comprising:
    an inverter inverting the network-initiated power management recovery signal to the header.

13. The controller according to claim 9, further comprising:
    an inverter gating auxiliary power for the network interface card to main power for the network interface card when a bus power signal is asserted and disconnecting the auxiliary power from the main power when the bus power signal is not asserted.

14. The network interface controller according to claim 13, wherein the inverter comprises:
    a first transistor coupled to the main power and the auxiliary power; and
    a second transistor coupled to the first transistor, the auxiliary power, and the bus power signal.

15. The controller according to claim 9, wherein the control circuit is operable within a system that does not provide 3.3V power to provide 3.3V power from the voltage regulator.

16. For use in a network interface controller, a method of power and power management signaling control comprising:
    providing a single voltage regulator coupled to a network-initiated power management recovery signal and a power management recovery bus signal, selectively coupled to a motherboard header, and coupled to an auxiliary power bus signal if available;

operating a control system for the voltage regulator to provide power to a network interface card and power management signals, if necessary, independent of whether the controller is installed within a system not supporting network-initiated power management recovery, a system supporting network-initiated power management recovery through the header, or a system supporting network-initiated power management recovery through the power management recovery bus signal;

operating the control system to provide auxiliary power to the network interface card independent of whether the controller is installed within a system not providing auxiliary power, a system providing auxiliary power from the header, or a system providing auxiliary power from the auxiliary power bus signal; and providing auxiliary power to the network interface card independent of whether the auxiliary power bus signal is grounded.

17. The method according to claim 16, further comprising:

inverting the network-initiated power management recovery signal to the header.

18. The method according to claim 17, wherein inverting the network-initiated power management recovery signal comprises inverting the network-initiated power management recovery signal to generate a Power Management Event (PME) signal for the motherboard header.

19. The method according to claim 16, further comprising:

gating auxiliary power for the network interface card to main power for the network interface card when a bus power signal is asserted; and disconnecting the auxiliary power from the main power when the bus power signal is not asserted.

20. The method according to claim 16, further comprising:

preventing back powering of a bus to which the control system is coupled during hibernate states;

preventing system power short circuiting of and leakage malfunctions in the control system when the header is incorrectly connected or unconnected to the motherboard; and preventing auxiliary power shorts to ground when an auxiliary power bus signal coupled to the control system is grounded.

* * * * *